US009021310B1

(12) United States Patent
McCabe et al.

(10) Patent No.: US 9,021,310 B1
(45) Date of Patent: Apr. 28, 2015

(54) POLICY-DRIVEN AUTOMATIC NETWORK FAULT REMEDIATION

(75) Inventors: Karl A. McCabe, Dublin (IE); Brian White, Dublin (IE); Brian J. Callan, Dublin (IE); Robert Kennedy, Dublin (IE)

(73) Assignee: Amazon Technologies, Inc., Reno, NV (US)

( * ) Notice: Subject to any disclaimer, the term of this patent is extended or adjusted under 35 U.S.C. 154(b) by 299 days.

(21) Appl. No.: 13/396,372

(22) Filed: Feb. 14, 2012

(51) Int. Cl.
*H04L 12/24* (2006.01)
(52) U.S. Cl.
CPC .................................. *H04L 41/0659* (2013.01)
(58) Field of Classification Search
CPC ............ G06F 11/2038; G06F 11/0757; G06F 11/2007; H04L 1/0659
USPC ........................ 714/4.2, 4.3, 43; 370/216, 217
See application file for complete search history.

(56) References Cited

U.S. PATENT DOCUMENTS

| | | | |
|---|---|---|---|
| 6,269,330 B1* | 7/2001 | Cidon et al. | 714/43 |
| 6,332,198 B1* | 12/2001 | Simons et al. | 714/6.31 |
| 6,687,846 B1* | 2/2004 | Adrangi et al. | 714/4.4 |
| 7,536,595 B1* | 5/2009 | Hiltunen et al. | 714/26 |
| 7,590,503 B2* | 9/2009 | Neuman et al. | 702/117 |
| 7,827,446 B2* | 11/2010 | Kimura et al. | 714/43 |
| 8,020,034 B1* | 9/2011 | Shrivastava et al. | 714/4.11 |
| 2003/0226056 A1* | 12/2003 | Yip et al. | 714/4 |
| 2007/0260911 A1* | 11/2007 | Marilly et al. | 714/4 |

* cited by examiner

*Primary Examiner* — Philip Guyton
(74) *Attorney, Agent, or Firm* — Novak Druce Connolly Bove + Quigg LLP

(57) ABSTRACT

A policy-driven automatic network remediation service is described, which resides on the network and is triggered when a network fault is detected. Once triggered, the service automatically connects to network devices in the topological locale of the detected fault and collects diagnostic information from the affected area, running diagnostics which are appropriate to the fault type. The service can validate a set of preconditions prior to taking remedial action. For example, the service can empirically validate that the network topology is actually as expected and that automatic remediation would be safe and would not compromise network availability or redundancy. Diagnostic information can be recorded in a trouble ticket to support post-event auditing. Once the preconditions have been validated, the service can automatically take corrective action based on the type of the fault, such as shutting down an interface on a particular network device.

28 Claims, 6 Drawing Sheets

POLICY-DRIVEN AUTOMATIC NETWORK FAULT REMEDIATION

BACKGROUND

In the context of computer networking, network devices, such as routers, switches, servers, workstations, printers and modem racks are often monitored for faults in an effort to detect, isolate and correct the various errors that may occur on a device. For example, Simple Network Management Protocol (SNMP) is one protocol that is often implemented to monitor the various devices on the network. Conventionally, when a fault or error occurs on the network, a network component will issue a notification to a technician or an administrator using SNMP, and the technician will attempt to resolve the problem.

There is a wide variety of problems and faults that can occur on the network. Some of these problems require human intervention while others can be resolved by automated computer programs. Some errors are caused by hardware malfunctions, others by faulty software, high amounts of traffic and various other issues.

For certain types of problems, it may be desirable to shut down the affected component immediately in order to prevent it from processing any more traffic. For example, components having errors that cause an impact to the clients of the network may be particularly worrisome and in certain instances, it can be appropriate to take these network resources offline immediately.

BRIEF DESCRIPTION OF THE DRAWINGS

Various embodiments in accordance with the present disclosure will be described with reference to the drawings, in which.

DETAILED DESCRIPTION

Figure 1:
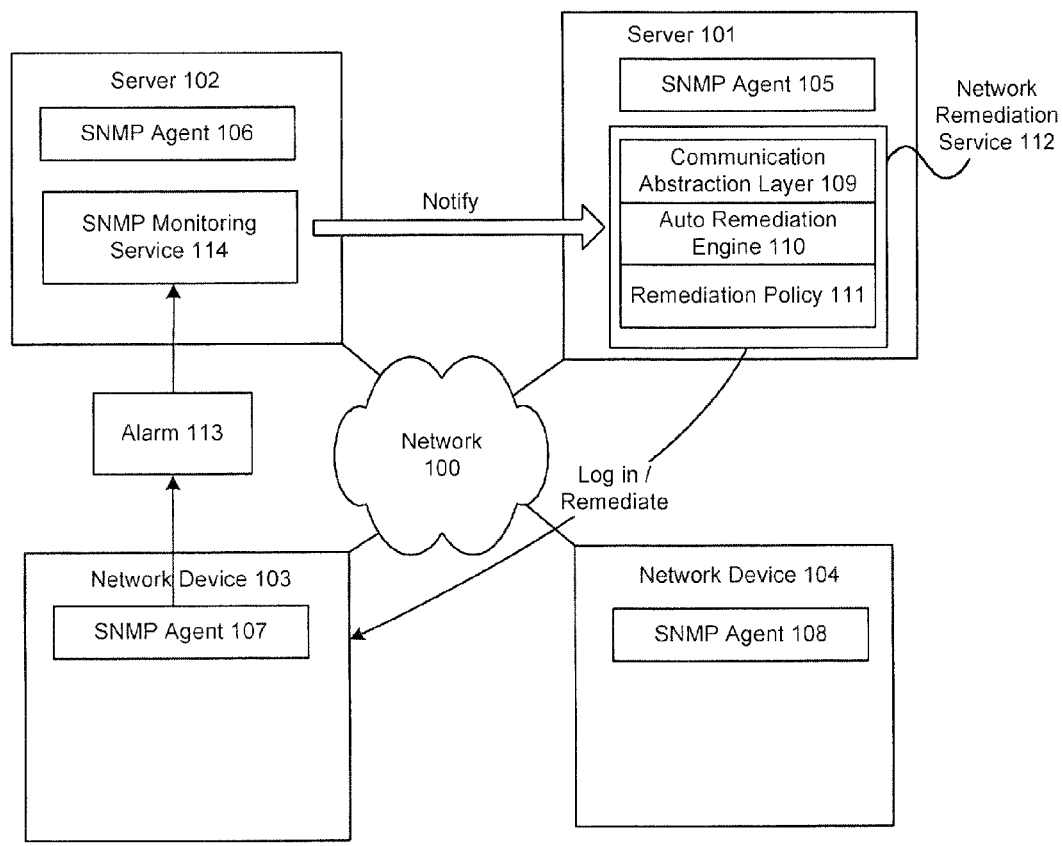
FIG. 1 is an illustration of a network remediation service, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments overcome the aforementioned and other deficiencies in existing approaches for providing computer network fault tolerance. In particular, various embodiments provide approaches to enable automatic network fault remediation based on one or more policies.

In accordance with various embodiments, a policy-driven automatic network remediation service is described. The service can be deployed and running on the network, and can be triggered when a network fault is detected. In accordance with an embodiment, the service automatically connects to network devices in the topological locale of the detected fault and collects diagnostic information from the affected area, running diagnostics which are appropriate to the fault type. In accordance with an embodiment, the service then validates several preconditions prior to taking remedial action. For example, the service can empirically validate that the network topology is actually as expected and that automatic remediation would be safe and would not compromise network availability or redundancy. Diagnostic information is automatically associated with the relevant trouble ticket to support post-event auditing and to reduce the burden on a support engineer.

In accordance with an embodiment, when the preconditions have been validated, the service automatically takes corrective action based on the type of the fault. For example, the service may shut down a network interface if the type of fault detected is a cyclic redundancy check (CRC) error. As another example, the automatic remediation service may reconfigure the network component with different settings. Various other corrective actions may be performed as well within the scope of the present disclosure.

In accordance with various embodiments, the trigger mechanism for the automatic remediation service can be constrained in various ways. For example, the service can be configured to fire at most a certain number of times before disabling itself to avoid collateral damage. In this case, the service would stay disabled until human intervention validates that the actions it took were warranted.

In accordance with another embodiment, the service can be configured to be rate limited. For example, it can be configured to auto-remediate no more than a certain number of events or devices within a given time period and/or topological or geographic area.

In accordance with an embodiment, the service can be configured to respect availability policy. For example, it can be configured to trigger in only one availability zone per region in a given time period.

In accordance with an embodiment, the service can be configured to respect policy related to the network fabric. For example, the remediation service can carry out one set of corrective actions for components located in the core network (e.g. portion of the network containing the backend servers) and a different set of corrective actions for components located in the border network (e.g. portion of the network connecting the core network to the Internet). In accordance with an embodiment, the service can be configured to take different actions depending on the role of the affected network devices or links. For example, the service may remediate links between core routers (due the abundance of redundant capacity) but not remediate links from top of rack switches to aggregation routers.

FIG. 1 is an illustration of a network remediation service, in accordance with various embodiments. As illustrated, a service 112 can be deployed on the network 100 in order to provide policy-driven automatic network fault remediation for the various resources connected to the network 100, such as computer servers (101, 102) and network devices (103, 104). In accordance with the illustrated embodiment, a single instance of the remediation service is deployed on server 101. However, in alternative embodiments, multiple instances of the remediation service can be implemented, such as an instance of the service residing on each device on the network.

In accordance with an embodiment, the network remediation service can, in response to detection of certain types of network failure, take automated action that does not require human intervention in order to mitigate the problem. For example, when a particular type of network fault is detected, the remediation service can connect to the affected device and execute a set of diagnostic commands on that device. In accordance with an embodiment, these diagnostic commands can be specific to the type of event that was detected. The output of those diagnostic commands can then be recorded in a trouble ticket that is issued as a result of the detected problem. This can provide the network technician with a useful diagnostic trace of the problem that has occurred.

In addition, the network remediation service can verify that a set of certain preconditions were met and if they were satisfied, the service can shut down the affected interface on the device and cause the traffic on the device to start flowing through a different interface of that device (or a different device). For example, if the problem is determined to be a dirty optics causing data corruption, it may be useful to shut down the interface in order to mitigate impact of the problem to the clients of the network.

In accordance with an embodiment, once the interface has been shut down, the network remediation service can disable itself as a safety check in order to prevent too many network resources from being shut down by the service. Because shutting down interfaces and devices can be quite destructive to the network, the remediation service can be restricted to shutting down a limited number of such devices or interfaces in order to prevent any malfunctions or undesirable effects. Thus, in accordance with an embodiment, the network remediation service can be configured to attempt to perform a corrective action (or perform the corrective action) a specified maximum number of times before disabling or suspending itself. Thereafter, the service can wait for human intervention to verify that the corrective action (e.g. shutting down the interface) was proper and to reset the service.

Illustrated in the embodiment of FIG. 1, the network includes two servers (101, 102) and two network devices (103, 104), each having a Simple Network Management Protocol (SNMP) agent (105, 106, 107, 108) running thereon. In accordance with various embodiments, the devices on the network can be any type of device, including, but not limited to computers, servers, switches, routers, access servers, bridges, hubs, printers, telephones and video cameras. The SNMP agent is a software module that is running on a device, has local knowledge of management information for that device and translates that information to or from an SNMP specific form.

In accordance with the illustrated embodiment, an SNMP agent 107 running on device 103 can detect that a fault has occurred in the device 103 and issue an alert 113 to the SNMP network monitoring service 114. The SNMP monitoring service 114 can in turn notify the network remediation service 112 of this alert and the remediation service can take a series of steps to remedy the fault. Alternatively, the fault can also be ascertained by the SNMP monitoring agent being polled— either by a server-based SNMP monitoring service or by the network remediation service itself.

In accordance with an embodiment, once the auto remediation service 112 has been notified, it inspects the alarm details and logs into the affected device 103. Once logged in, the service can run a number of commands to verify that all the preconditions have been met for auto remediation.

In accordance with an embodiment, one of the preconditions checked by the service is to verify that it has logged into the correct device where the fault has actually occurred. Conventionally, a Domain Name System (DNS) can be inspected to uniquely identify the device. In addition, a discovery protocol, such as Cisco® Discovery Protocol (CDP), can be used to determine what device is on the end of a network link. In accordance with an embodiment, the alarm is issued for a link between two devices and CDP can be used to verify the two devices mentioned in the alarm, as part of the preconditions checked by the service.

In accordance with an embodiment, another precondition checked by the service is to verify that the device resides in a location on the network that is safe to automatically remediate in. For example, ring capacity in certain clusters on the network may not be sufficient to safely warrant automatically shutting down an interface and for those clusters, a human intervention may be appropriate instead.

If all of the preconditions have been validated, the auto remediation service can perform the appropriate corrective action on the device 103 or instruct another component to perform the corrective action on device 103. In accordance with an embodiment, if the error type that was detected was a cyclic redundancy check (CRC) error, the remediation service can issue an interface shut down command on the device.

In accordance with an embodiment, once the corrective action has been performed, the auto remediation service 112 can take itself offline as a safety check in order to prevent too many interfaces or devices from being shut down on the network. In accordance with alternative embodiments, the service can be configured to perform a specified number of times before disabling itself.

In accordance with an embodiment, the network auto remediation service 112 can be policy driven. In particular, the auto remediation engine 110 of the service can inspect a remediation policy 111 to determine the various actions and commands that should be performed based on the particular fault detected. The policy can be configurable by a network administrator and can indicate the various configuration options for performing auto remediation. For example, the policy can specify a maximum number of times that the corrective action should be performed by the network remediation service before the network remediation service is disabled. As another example, the policy can specify various corrective actions that should be taken by the service according to a role of the network device being affected. For example, the policy may indicate that if the affected device is a core router, the corrective action should be to shut down the affected interface, whereas if the affected device is an edge router, the corrective action should be to wait for a network technician to inspect the problem.

In addition, the policy may specify corrective actions according to active network conditions (e.g. processing load, traffic, etc.) occurring at a time of determining that the error has occurred. Moreover, the rules for performing the corrective action may be dependent on the type of network where the network device is located, a geographic region where the network device is located or a relationship between the affected network device and other network devices.

In addition, the network remediation service 112 can include a communication abstraction layer 109 that abstracts the numerous specific protocols or means of communication used by network devices from the remediation engine. As an example, the specific commands to perform a corrective action to shut down the affected component of the device may vary depending on the type of device that is involved. The communication abstraction layer 109 can be a component that will take a simple command to shut down the affected component from the engine 110 and carry out the necessary specific protocol commands to actually perform that shut down procedure.

Figure 2:
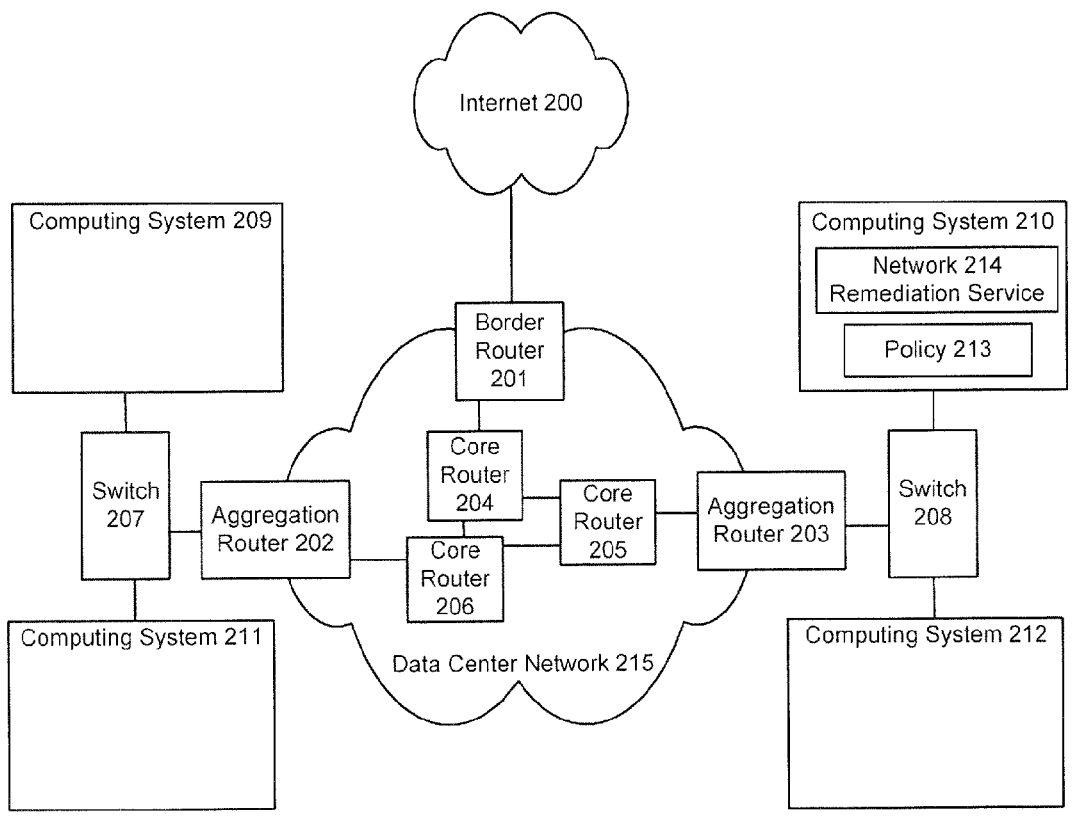
FIG. 2 is an alternative illustration of a network remediation service, in accordance with various embodiments.

FIG. 2 is an alternative illustration of a network remediation service, in accordance with various embodiments. As illustrated, the auto remediation service 214 resides in a data center network 215 that includes a plurality of different devices and sub-networks. For example, the data center network 215 includes a plurality of computing systems (209, 210, 211, 212), switches (207, 208), aggregation routers (202, 203), border router 201, and core routers (204, 205, 206). Switch 207 can be a part of a physical sub-network that includes computing systems 209 and 211, and is connected to aggregation router 202. Similarly, Switch 208 can be a part of a physical sub-network that includes computing systems 210 and 212, and is connected to aggregation router 203. As such, the aggregation routers 202-203 provide gateways between two or more sub-networks and border router 201 provides a gateway to external other networks such as the Internet 200.

In accordance with the illustrated embodiment, the network auto remediation service 214 is shown as residing on computing system 210. However, in alternative embodiments, the service can reside on another network device or be deployed on all network devices. In accordance with an embodiment, the remediation service 214 can inspect a policy file 213 in order to determine the specific parameters for performing auto remediation. The policy may be specific to the role of the network device involved. For example, the policy may specify that interfaces on any of the core routers 204-206 can be shut down automatically, while errors occurring on interfaces on the routers 201-203 require human interaction. Similarly, the policy may specify that errors occurring in the sub-network formed by switch 207 and computing systems (209, 211) can be remediated automatically, while errors in the sub-network formed by switch 208 and computing systems (210, 212) should not be auto remediated and should require inspection by a network technician. Various other policies can be implemented as well, as will be apparent to one of ordinary skill in the art based on the teachings of the present disclosure.

Figure 3:
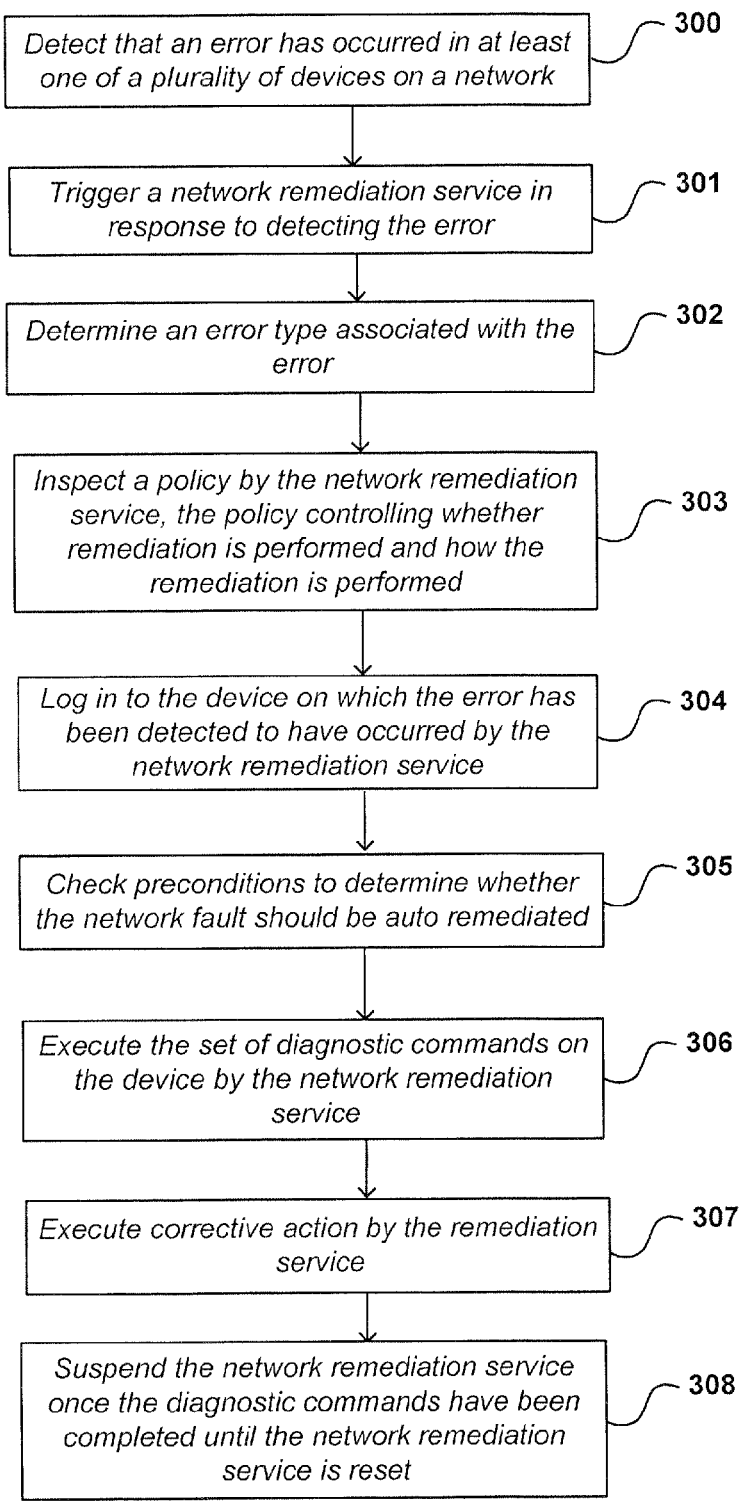
FIG. 3 illustrates an example process for providing policy-driven automatic network fault remediation, in accordance with various embodiments.

FIG. 3 illustrates an example process for providing policy-driven automatic network fault remediation, in accordance with various embodiments. Although this figure, as well as other process illustrations contained in this disclosure may depict functional steps in a particular sequence, the processes are not necessarily limited to the particular order or steps illustrated. One skilled in the art will appreciate that the various steps portrayed in this or other figures can be changed, rearranged, performed in parallel or adapted in various ways. Furthermore, it is to be understood that certain steps or sequences of steps can be added to or omitted from the process, without departing from the scope of the various embodiments.

As shown in step 300, an error is detected to have occurred in at least one of a plurality of devices on a network. For example, the error can be detected by an SNMP monitoring system that issues an alarm when a count of particular errors has reached an unacceptable level on a device on the network. In response to the detection of the error, the network remediation service is triggered (as shown in step 301).

In step 302, an error type is determined for the error that has occurred. In accordance with various embodiments, the error type can be determined by the network remediation service or by the system that has issued the alarm, or by any other component having a connection to the network.

In step 303, the network remediation service inspects a policy that controls whether remediation is performed and how that remediation will be performed. For example, a policy may specify how to carry out remediation in a particular geographical location, or which steps to carry out in a particular network fabric (border network vs. core network), or control how many interfaces can be shut down before the remediation service disables itself. Various other policies can also be implemented within the scope of the various embodiments.

In step 304, the network remediation service logs into the device on which the error has been detected to have occurred. The logging in can be performed over secure shell (SSH) protocol or other means of communication.

In step 305, the remediation service can check a set of preconditions in order to determine whether the detected network fault should be auto remediated. For example, the service can check whether it would be safe to automatically shut down an interface on the device and whether there is sufficient redundancy in the network.

In step 306, the network remediation service executes a set of diagnostic commands on the device that it is logged into. For example, the diagnostic commands may provide a set of debugging information regarding the fault that was detected on the device. In accordance with one embodiment, the results of the diagnostic commands can be recorded in a ticket issued by the network monitoring service in order to provide sufficient details to the network technician viewing the ticket. In certain embodiments, it may be useful to execute the diagnostic commands independently of the step of satisfying the preconditions (step 305). Thus, even if the preconditions were not satisfied for auto-remediating, the service may nonetheless execute the diagnostic commands and record the resulting troubleshooting information in the ticket.

In step 307, the network remediation service performs a corrective action based on the error type of the error that was detected. For example, if the error impacts the clients of the network, the corrective action may be to shut down the affected interface of the device.

In step 308, the network remediation service suspends itself once the diagnostic commands have been completed. After the corrective action is reviewed by the network technician, the auto remediation service can be reset to execute again.

Figure 4:
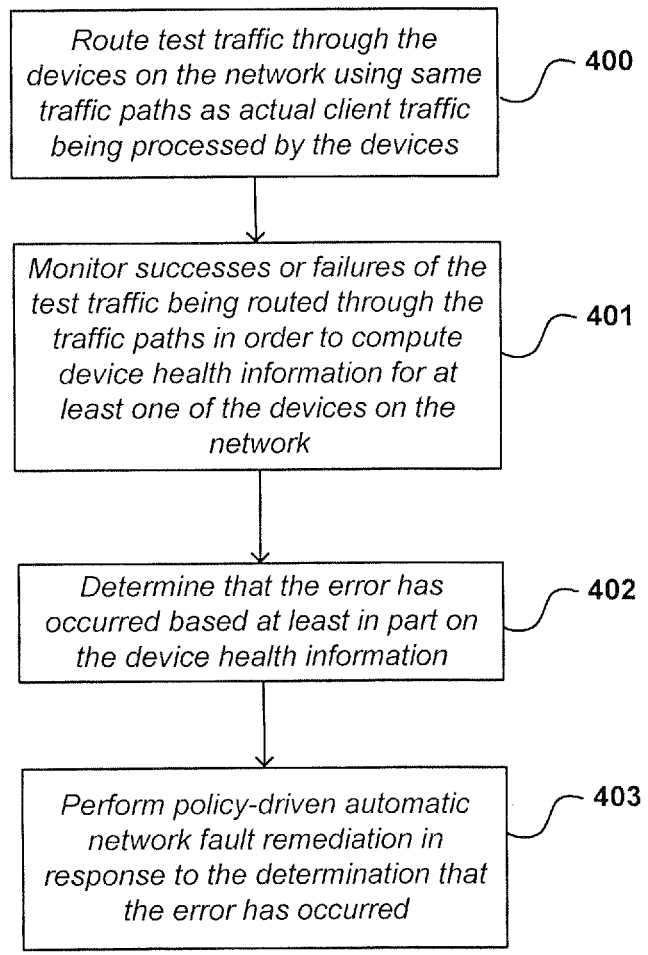
FIG. 4 illustrates an example process for detecting the error on the network, in accordance with various embodiments.

FIG. 4 illustrates an example process for detecting the error on the network, in accordance with various embodiments. As shown in step 400, test traffic can be routed through the various devices on the network using same traffic paths as actual client traffic that is being processed by those devices. In accordance with an embodiment, this can be performed by a network monitoring tool that is separate from the network remediation service. Alternatively, this function can be performed by the network auto remediation service itself.

In step 401, the successes and/or failures of the test traffic being routed through the traffic paths is monitored. This can be performed in order to compute device health information for at least one of the devices on the network. For example, if enough traffic flowing through a particular interface has been lost or corrupted, it can be determined that the health of that device or interface is suspect and an alarm can be issued. In step 402, it can be determined that the error has occurred based at least in part on the device health information that was collected by routing the test traffic through the network. In step 403, the network remediation service can be invoked in order to analyze the error and perform automatic remediation depending on the various factors as described above.

Figure 5:
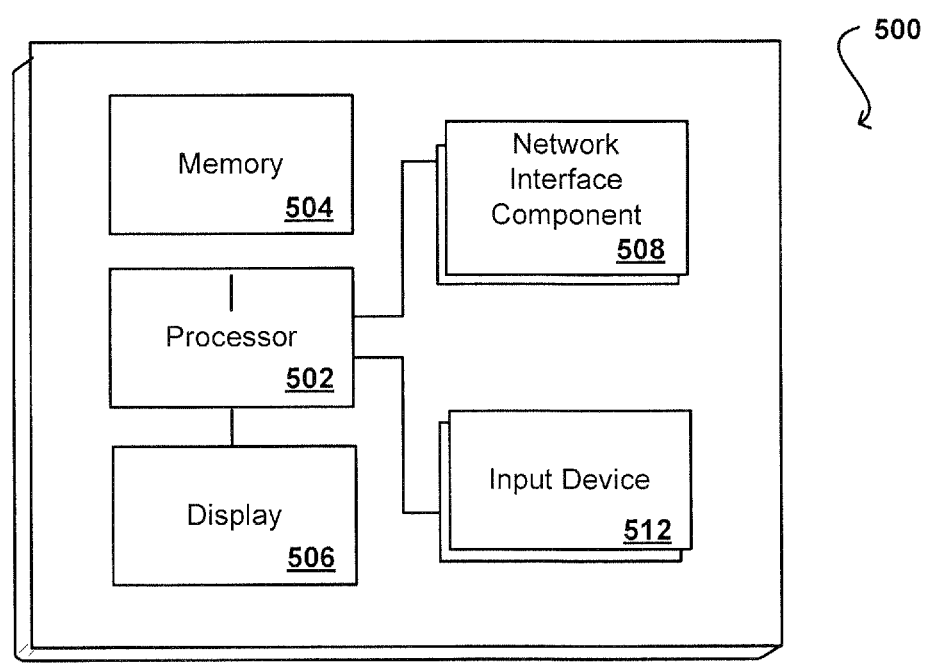
FIG. 5 illustrates example components of a network device in accordance with various embodiments.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Figure 6:
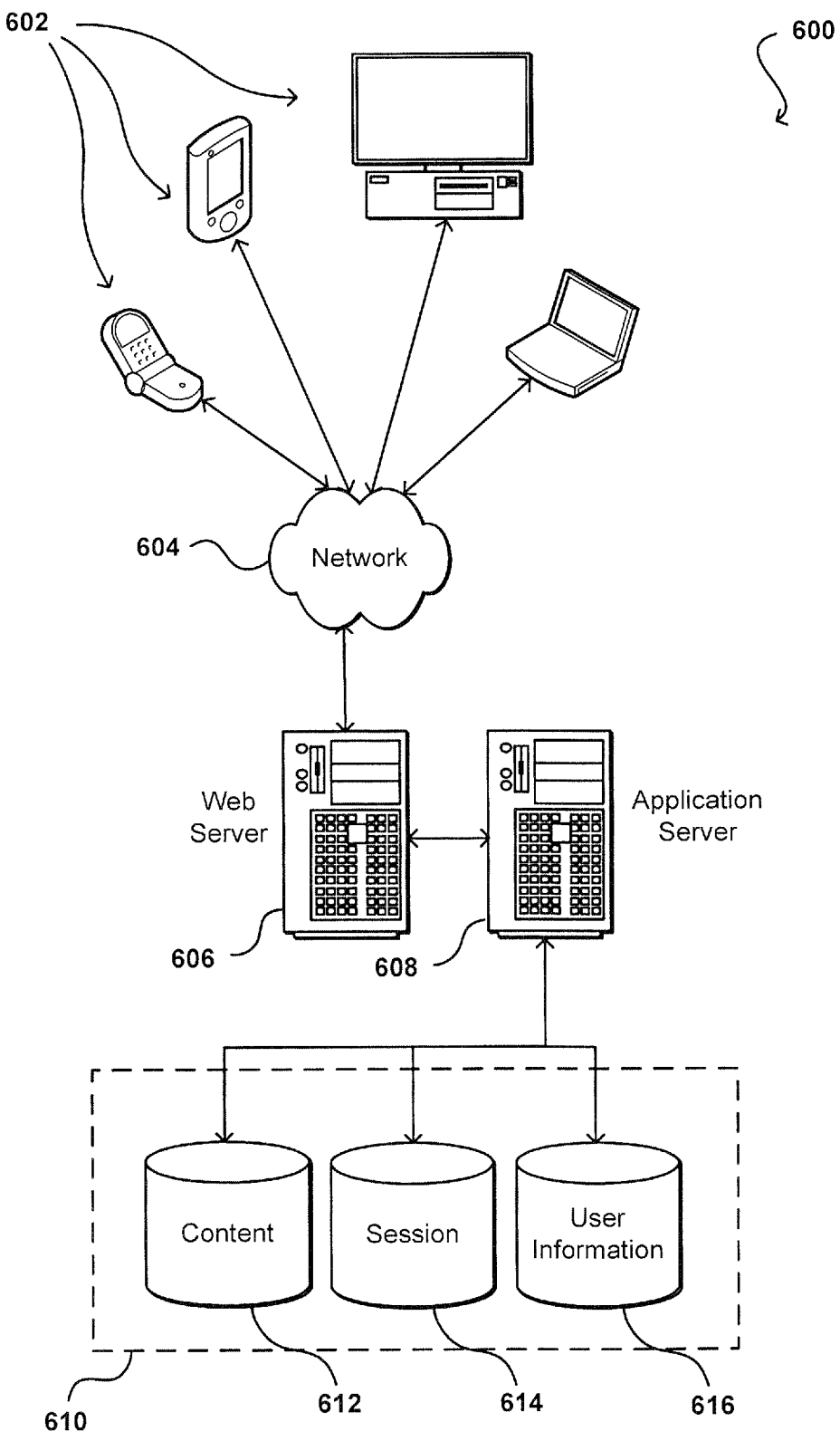
FIG. 6 illustrates an environment in which various embodiments can be implemented.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for policy-driven automatic network fault remediation, the method comprising:
    receiving a notification by a network remediation service, the notification indicating that an error has been detected in at least one of a plurality of devices on a network, the error being associated with a particular error type;
    inspecting a policy by the network remediation service, the policy controlling how remediation of the error is performed;
    logging in to a device on the network on which the error has been detected to have occurred by a network remediation service;
    checking a set of preconditions to determine whether a corrective action should be performed on the device;
    causing a set of diagnostic commands to be executed on the device by the network remediation service;
    performing the corrective action by the network remediation service, the corrective action being based on the error type of the error; and
    causing the network remediation service to suspend itself in response to a determination that a predetermined number of corrective actions have been performed as specified in the policy, wherein the determination that the predetermined number of corrective actions have been performed includes tracking a number of interfaces or devices that have been shut down by the network remediation service.

2. The computer-implemented method of claim 1, wherein the policy specifies that if the error type is determined to be a cyclic redundancy check (CRC) error, the corrective action includes a command to shut down an interface on the device and to route traffic through a different interface on the device.

3. The computer-implemented method of claim 1, wherein the network remediation service is configured to attempt to execute the corrective action a specified maximum number of times before suspending.

4. The computer-implemented method of claim 1, further comprising:
recording a set of information obtained by execution of the diagnostic commands in a trouble ticket that is issued as a result of detecting the error.

5. The computer-implemented method of claim 1, further comprising:
evaluating one or more preconditions before executing the corrective action in order to validate that execution of the corrective action will not compromise the network, the one or more preconditions including one or more of the following: (a) verifying that the network remediation service is logged into the correct device on the network where the error has occurred; (b) verifying that the state information of an alarm associated with the error matches the state information on the device; or (c) verifying that the device is located in a part of the network where the corrective action is safe to execute.

6. The computer-implemented method of claim 1, wherein the error is detected by:
routing test traffic through the plurality of devices on the network using traffic paths used by client traffic being processed by the plurality of devices;
monitoring successes or failures of the test traffic being routed through the traffic paths in order to compute device health information for at least one of the devices on the network; and
determining that the error has occurred based at least in part on the device health information.

7. A computer-implemented method for policy-driven automatic network fault remediation, the method comprising:
determining, by a network remediation service, that an error of a particular error type has occurred on a network device;
examining a policy to determine whether a corrective action should be performed, the policy associating the corrective action with the particular error type of the error;
causing the corrective action to be performed on the network device by the network remediation service; and
causing the network remediation service to disable itself in response to a determination that a predetermined number of corrective actions have been performed as specified in the policy, wherein the determination that the predetermined number of corrective actions have been performed includes tracking a number of interfaces or devices that have been shut down by the network remediation service.

8. The computer-implemented method of claim 7, wherein the policy specifies a maximum number of times that the corrective action should be performed by the network remediation service before the network remediation service is disabled.

9. The computer-implemented method of claim 7, wherein the policy specifies the corrective action according to a role of the network device on a network.

10. The computer-implemented method of claim 7, wherein the policy specifies the corrective action according to active network conditions occurring at a time of determining that the error has occurred.

11. The computer-implemented method of claim 7, wherein the policy includes a set of rules for performing the corrective action, the set of rules being dependent on one or more of the following: (a) a type of network where the network device is located; (b) a geographic region where the network device is located; or (c) a relationship between the network device and another network device.

12. The computer-implemented method of claim 7, wherein the policy specifies that if the error type is determined to be a cyclic redundancy check (CRC) error, the corrective action is a command to shut down an interface on the network device and to route traffic through a different interface on the network device.

13. The computer-implemented method of claim 7, wherein performing the corrective action on the network device further includes:
evaluating a set of preconditions before executing the corrective action in order to validate that execution of the corrective action will not compromise a network, the one or more preconditions including one or more of the following: (a) verifying that the network remediation service is logged into the correct network device where the error has occurred; (b) verifying that the state information of an alarm associated with the error matches the state information on the network device; or (c) verifying that the network device is located in a part of the network where the corrective action is safe to execute.

14. The computer-implemented method of claim 7, wherein determining that an error occurred on a network device further includes:
routing test traffic through a plurality of network devices on a network using traffic paths used by client traffic processed by the plurality of network devices;
monitoring successes or failures of the test traffic being routed through the traffic paths in order to compute device health information for at least one of the plurality of network devices; and
determining that the error has occurred based at least in part on the device health information.

15. A computing device including a storage memory storing a set of instructions and one or more hardware processors that execute the set of instructions to perform a set of steps comprising:
determining when an error of a particular error type has occurred on a network device by a network remediation service;
examining a policy to determine whether a corrective action should be performed, the policy associating the corrective action with the particular error type of the error;
causing the corrective action to be performed on the network device by the network remediation service; and
causing the network remediation service to disable itself in response to a determination that a predetermined number of corrective actions have been performed as specified in the policy, wherein the determination that the predetermined number of corrective actions have been performed includes tracking a number of interfaces or devices that have been shut down by the network remediation service.

16. The computing device of claim 15, wherein the policy specifies a maximum number of times that the corrective action should be performed by the network remediation service before the network remediation service is disabled.

17. The computing device of claim 15, wherein the policy specifies the corrective action according to a role of the network device on a network.

18. The computing device of claim 15, wherein the policy specifies the corrective action according to active network conditions occurring at a time of determining that the error has occurred.

19. The computing device of claim 15, wherein the policy includes a set of rules for performing the corrective action, the set of rules being dependent on one or more of the following: (a) a type of network where the network device is located; (b) a geographic region where the network device is located; or (c) a relationship between the network device and another network device.

20. The computing device of claim 15, wherein the policy specifies that if the error type is determined to be a cyclic redundancy check (CRC) error, the corrective action is a command to shut down an interface on the network device and to route traffic through a different interface on the network device.

21. The computing device of claim 15, wherein performing the corrective action on the network device further includes:
    evaluating a set of preconditions before executing the corrective action in order to validate that execution of the corrective action will not compromise a network, the one or more preconditions including one or more of the following: (a) verifying that the network remediation service is logged into the correct network device where the error has occurred; (b) verifying that the state information of an alarm associated with the error matches the state information on the network device; or (c) verifying that the network device is located in a part of the network where the corrective action is safe to execute.

22. The computing device of claim 15, wherein determining that an error occurred on a network device further includes:
    routing test traffic through a plurality of network devices on a network using traffic paths used by client traffic processed by the plurality of network devices;
    monitoring successes or failures of the test traffic being routed through the traffic paths in order to compute device health information for at least one of the plurality of network devices; and
    determining that the error has occurred based at least in part on the device health information.

23. A non-transitory computer readable storage medium storing one or more sequences of instructions executable by one or more processors to perform a set of steps comprising:
    determining when an error of a particular error type has occurred on a network device by a network remediation service;
    examining a policy to determine whether a corrective action should be performed, the policy associating the corrective action with the particular error type of the error;
    causing the corrective action to be performed on the network device by the network remediation service; and
    causing the network remediation service to disable itself in response to a determination that a predetermined number of corrective actions have been performed as specified in the policy, wherein the determination that the predetermined number of corrective actions have been performed includes tracking a number of interfaces or devices that have been shut down by the network remediation service.

24. The non-transitory computer readable storage medium of claim 23, wherein the policy specifies a maximum number of times that the corrective action should be performed by the network remediation service before the network remediation service is disabled.

25. The non-transitory computer readable storage medium of claim 23, wherein the policy specifies the corrective action according to a role of the network device on a network.

26. The non-transitory computer readable storage medium of claim 23, wherein the policy specifies that if the error type is determined to be a cyclic redundancy check (CRC) error, the corrective action is a command to shut down an interface on the network device and to route traffic through a different interface on the network device.

27. The non-transitory computer readable storage medium of claim 23, wherein performing the corrective action on the network device further includes:
    evaluating a set of preconditions before executing the corrective action in order to validate that execution of the corrective action will not compromise a network, the one or more preconditions including one or more of the following: (a) verifying that the network remediation service is logged into the correct network device where the error has occurred; (b) verifying that the state information of an alarm associated with the error matches the state information on the network device; or (c) verifying that the network device is located in a part of the network where the corrective action is safe to execute.

28. The non-transitory computer readable storage medium of claim 23, wherein determining that an error occurred on a network device further includes:
    routing test traffic through a plurality of network devices on a network using traffic paths used by client traffic processed by the plurality of network devices;
    monitoring successes or failures of the test traffic being routed through the traffic paths in order to compute device health information for at least one of the plurality of network devices; and
    determining that the error has occurred based at least in part on the device health information.

* * * * *